US012606878B2

(12) United States Patent
Huang et al.

(10) Patent No.: US 12,606,878 B2
(45) Date of Patent: Apr. 21, 2026

(54) Al—Si COATED PRESS HARDENING COMPONENT, A PREPARATION METHOD AND USE THEREOF

(71) Applicant: The University of Hong Kong, Hong Kong (CN)

(72) Inventors: Mingxin Huang, Hong Kong (CN); Ming Guan, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 14 days.

(21) Appl. No.: 18/434,748

(22) Filed: Feb. 6, 2024

(65) Prior Publication Data

US 2024/0271238 A1 Aug. 15, 2024

(30) Foreign Application Priority Data

Feb. 9, 2023 (CN) .......................... 202310085341.2

(51) Int. Cl.
| | |
|---|---|
| *C21D 8/00* | (2006.01) |
| *B21D 22/02* | (2006.01) |
| *B32B 15/01* | (2006.01) |
| *C21D 1/84* | (2006.01) |

(52) U.S. Cl.
CPC ............ *C21D 8/005* (2013.01); *B32B 15/012* (2013.01); *C21D 1/84* (2013.01); *B21D 22/022* (2013.01); *C21D 2201/00* (2013.01); *C21D 2211/001* (2013.01)

(58) Field of Classification Search
None
See application file for complete search history.

(56) References Cited

FOREIGN PATENT DOCUMENTS

| | | |
|---|---|---|
| CN | 101583486 B | 8/2014 |
| CN | 104769138 A | 7/2015 |
| CN | 107614733 A | 1/2018 |
| CN | 108588612 B | 9/2019 |
| CN | 106466697 B | 1/2020 |
| CN | 116000169 A | 4/2023 |

OTHER PUBLICATIONS

Yoo et al., "Effects of Al—Si coating structures on bendability and resistance to hydrogen embrittlement in 1.5-GPa-grade hot-press-forming steel", Dec. 19, 2021, Acta Materialia, 225, 117561. (Year: 2021).*
AHSS Insights, "Bend Testing", 2004, <https://ahssinsights.org/tag/vda-238-100/>. (Year: 2004).*

* cited by examiner

*Primary Examiner* — Xiaobei Wang
(74) *Attorney, Agent, or Firm* — Leason Ellis LLP

(57) ABSTRACT

An Al—Si coated press hardening component, wherein the Al—Si coating comprises a low-Al content ferrite layer with an Al content of less than 5 wt % and a thickness of greater than 5 μm, and having a maximum bending angle of the Al—Si coated press hardening component is greater than 65°. The thickness of the tough low-Al content ferrite layer in the Al—Si coating after hot stamping, reaching 5-100 μm, by improving the hot stamping process, so that the formation or propagation of cracks on the surface or the coating is effectively prevented, and the bendability of the pre-coated steel after hot stamping is improved. At the same time, the hot stamping process of the present invention can take into account or optimize the microstructure of the steel substrate to further improve the bendability and tensile property of the whole material.

20 Claims, 6 Drawing Sheets

1. Traditional hot stamping process

2. Hot stamping process of the present invention

2000 MPa Al-Si coated press hardening steel

FIG. 9

Al—Si COATED PRESS HARDENING COMPONENT, A PREPARATION METHOD AND USE THEREOF

CROSS-REFERENCE TO RELATED PATENT APPLICATIONS

This application claims the benefit of priority to Chinese patent application Ser. No. 202310085341.2 filed on 9 Feb. 2023, which is incorporated herein by reference its entirety.

TECHNICAL FIELD

The present invention relates to an Al—Si coated press hardening component, a preparation method and use thereof, in particular to a method for improving the bendability of Al—Si coated press hardening steel and a press hardening component prepared by the method.

BACKGROUND ART

With setting of goals of "peak carbon dioxide emissions" and "carbon neutrality", energy conservation and emission reduction for automobiles have become a top priority, and reducing the weight of automobiles is an effective way to realize energy conservation and emission reduction. Among many lightweight materials, ultra-high strength steel is an ideal material for both realizing a reduction in the weight of automobiles and ensuring vehicle safety due to its advantages, such as high strength, low cost, and well-established processes.

A "hot stamping process" refers to a forming process in which fully austenitic steel is deformed by stamping at a high temperature and rapidly cooled at the same time to ultimately obtain ultra-high-strength steel components. This hot stamping process has the advantages of high forming accuracy and good weight reduction effect, etc. and is especially suitable for processing and forming of complex integrated thin-walled parts, such as A-pillars, B-pillars, roofs and beams of automobile body-in-white. The global output of press hardening steel (PHS) exceeds 6 million tons per year.

In actual hot stamping processes, in order to avoid oxidation and decarburization on the steel surface caused by high temperatures, a pre-coating treatment is usually performed on the steel surface. Among them, a high-temperature resistant Al—Si coating as described in patent CN101583486B, is most widely used. This process was invented by ArcelorMittal in 1999. The PHS with a pre-coated Al—Si coating was commercialized in 2007. In the process according to CN101583486B, the following hot stamping parameters are required: when the thickness of the steel sheet is between 0.7-1.5 mm, the heating temperature and time are within a quadrilateral defined by (3 min, 930° C.), (6 min, 930° C.), (13 min, 880° C.), and (4.5 min, 880° C.); when the thickness of the steel sheet is between 1.5-3 mm, the heating temperature and time are with the quadrilateral defined by (4 min, 940° C.), (8 min, 940° C.), (13 min, 900° C.), and (6.5 min, 900° C.). The thickness of the pre-coated Al—Si coating is from 20 to 33 μm. At present, Al—Si coating is still the only commercially available protective layer for PHS. More than 3 million tons Al—Si coated PHS is manufactured by ArcelorMittal every year, and this number is still vastly increasing. However, this technology is monopolized by ArcelorMittal. Thus, it is very important to develop alternative pre-coating technologies for both global automotive and steel companies.

Furthermore, another shortage of Al—Si pre-coating technology is that it inevitably compromises the bendability of PHS, which severely affects the safety of the application of PHS in automobiles. For example, FIG. 1 shows the results of VDA 238-100 standard bending test for PHS with and without an Al—Si coating, demonstrating that the Al—Si coating significantly reduces the bendability of steel after hot stamping. FIG. 2 shows the bending deformation of a B-pillar of an automobile after a real traffic accident. It demonstrates the importance of bendability of the B-pillar in protecting the passenger space during a traffic accident. Because the bendability of automobile components is critical for protecting the lives of passengers in accidents, the poor bendability of Al—Si coated PHS is one of the most significant limitations for the application of PHS in the automobile industry.

Some recent research papers and patent documents have reported several methods for improving the fracture toughness of Al—Si coated press hardening components as follows:

Patent CN108588612B involves a thin Al—Si coating with a thickness between 6-26 μm. The heating temperature is between 900° C. and 940° C., and the holding time is between 2 min and 5 min. The thin Al—Si coating improves the fracture toughness of hot stamped steel components. However, the brittleness of the Al—Si coating layer still remains and the hot stamping parameters for this technology are not optimized for a steel substrate yet.

ArcelorMittal's patent application, CN104769138A, discloses a decarburization technique for the steel substrate before Al—Si coating, thus the fracture toughness of Al—Si coated steels can be enhanced as a whole. However, this decarburization technique is complicated compared with the traditional hot stamping technique, which requires additional monetary cost and energy.

A patent issued to Baoshan Iron & Steel Co., Ltd. (Baosteel), CN106466697B, provides another range of hot stamping parameters for Al—Si coated steels. The preferable temperature is between 935 and 950° C. or between 945 and 950° C., and the holding time is between 2.5 to 5 min. Note that the range of hot stamping parameters of the Baosteel product is slightly higher than those of Arcelor-Mittal. However, in practice, the hot stamping parameters of the Baosteel process are likely to cause coarse austenite grains in the steel substrates, accounting for poorer fracture toughness of steel components. This confirms that in the traditional hot stamping technique, the hot stamping parameters can only be limited to a very small range.

A research paper entitled "Effects of Al—Si coating structures on bendability and resistance to hydrogen embrittlement in 1.5-GPa-grade hot-press-forming steel" in Acta Materialia explores how to improve the bendability of 1.5-GPa-grade PHS. However, this research ignored the difference between high Al content ferrite and low Al content ferrite, so the bendability of the obtained product is quite unstable. Furthermore, the hot stamping method proposed by the publication can only be applied to 1.5-GPa-grade PHS and fails to improve the bendability of 2-GPa-grade PHS. Most importantly, the method still uses the traditional one-step hot stamping process which cannot solve the problem of prior austenite grain size (PAGS) coarsening.

Patent CN107614733A proposes a hot-press forming (HPF) component with an excellent peeling resistance and a manufacturing method thereof. The inventive concept lies in that when a hot-dip aluminized steel with a hot-dip aluminized layer on its surface is subjected to an alloying heat treatment, only a soft single diffusion layer is formed by controlling the heat treatment conditions, so as to improve the peeling resistance of the coating. The hot-forming process is as follows: heating the hot-dip aluminized steel at a temperature of 900-990° C. for 2-30 minutes to allow alloying of the hot-dip aluminized layer on its surface; while being hot-formed, the alloyed hot-dip aluminized steel is quickly cooled to below 300° C. However, although this method forms a soft diffusion layer composed of α-ferrite of solid solution Al by controlling austenitization temperature and duration, which improves the peeling resistance of the coating, the heat treatment process will cause the steel substrate to produce larger prior austenite grain size, thereby reducing the overall bendability and ultimate tensile strength of the material.

In summary, although pre-coated aluminum and aluminum alloy coatings can prevent decarburization and surface oxidation of PHS, the coatings are brittle as a whole, which significantly reduces the bendability of the steel after hot stamping. There is an urgent need to study how to compensate the loss of bendability caused by Al—Si coating. The latest reported process has improved the bendability of traditional Al—Si coated PHS, but the bending toughness of components with an Al—Si coating is still lower than that without an Al—Si coating. Patent CN107614733A proposes a method of improving the peeling resistance of the coating by controlling heat treatment conditions to remove the brittle layer on the surface. However, this method will cause serious coarsening of austenite grains in the steel substrates and damage the bendability of the steel substrates. Therefore, in order to meet the increasingly strict standards in the automotive industry, there is still a need for more research and development work to improve the bending toughness of Al—Si coated components.

SUMMARY OF THE INVENTION

Aiming at the problem that the pre-coating causes the bendability of the steel to decrease, it is an object of the present invention to provide an improved press hardening steel (PHS) and a preparation process thereof, so as to improve the bendability of the pre-coated steel after hot stamping.

In an unpublished prior application, CN202111226071.X, the inventors provided a hot stamping method for pre-coated steel. The method particularly includes a preliminary heat treatment for pre-coated steel before hot stamping, and the preliminary heat treatment mainly includes a step of heating and heat preservation, and a step of cooling. The preliminary heat treatment can improve the alloying degree of the pre-coating, reduce the carbide structure in the steel substrate, and can obtain the substrate structure of martensite and/or bainite, thereby reducing the wear of the stamping die caused by the pre-coating, refining the crystal grains and improving the fracture property of the final press hardening components during high-temperature stamping deformation.

The interdiffusion zone between the coating and the substrate of PHS is ferrite, the thickness of which correlates with austenitization time. Although it is widely accepted that ferrite is softer than a martensite substrate, and can effectively improve the bendability of Al—Si coated PHS, many attempts failed to produce a thicker ferrite layer to improve the bendability of Al—Si coated PHS. After a careful study, the inventors of the present invention have found that only ferrite with a low Al content (the weight percentage of Al is equal to or less than 5%, preferably equal to or less than 3%) can restrict the propagation of crack tips to improve the bendability of Al—Si coated PHS. Based on this novel discovery, the hot stamping method of the present invention elevates the austenitization temperature and duration, and increases the thickness of a low-Al content ferrite layer successfully, thus significantly improving the bendability of Al—Si coated PHS. Furthermore, the inventors of the present invention also proposed for the first time that a second heat treatment for grain refinement can compensate for the damage of the above-mentioned first step of high temperature austenitization heat treatment to the bendability of the steel substrate, thereby obtaining an Al—Si coated press hardening component with an improved overall bendability.

In a first aspect, the present invention provides an Al—Si coated press hardening component, which comprises a steel substrate and an Al—Si coating arranged on at least one surface of the steel substrate, the Al—Si coating comprising a low-Al content ferrite layer having an Al content of less than 5 wt % formed by the interdiffusion between the steel substrate and an Al—Si pre-coating, wherein the thickness of the low-Al content ferrite layer is greater than 5 μm and the maximum bending angle of the Al—Si coated press hardening component is greater than 65°, as measured by the VDA 238-100 standard bending test.

In a preferred embodiment of the present invention, the thickness of the low-Al content ferrite layer is greater than 8 μm, such as greater than 10 μm or greater than 15 μm, and more preferably greater than 20 μm.

In various embodiments of the present invention, in order to fully prevent the formation and propagation of cracks on the surface or the coating, the thickness of the low-Al content ferrite layer may be 5-100 μm, preferably 5-25 μm.

In a preferred embodiment of the present invention, the low-Al content ferrite layer comprises an ultra-low-Al content ferrite layer with an Al content of less than 3 wt % and a thickness of greater than 4.7 μm, preferably greater than 8 μm, such as greater than 10 μm or greater than 15 μm, more preferably greater than 20 μm. In some embodiments of the present invention, the thickness of the ultra-low-Al content ferrite layer may be 4.7-100 μm, preferably 5-25 μm.

In various embodiments of the present invention, the thickness of the low-Al content ferrite layer accounts for 20%-98.5% of that of the Al—Si coating.

In some embodiments of the present invention, the maximum bending angle of the Al—Si coated press hardening component is greater than 70°, most preferably about 75°, as measured by the VDA 238-100 standard bending test.

In various embodiments of the present invention, the Al—Si coating may further comprise a high-Al content ferrite layer having an Al content of higher than 5 wt % formed by the interdiffusion between the steel substrate and the Al—Si pre-coating. However, in order to reduce the influence of brittleness of Al—Si coating on the bendability of steel after hot stamping, the thickness of the high-Al content ferrite layer should be as small as possible. That is, the Al—Si pre-coating in the raw material is intended to form a low-Al content ferrite layer or an ultra-low-Al content ferrite layer as much as possible.

In some embodiments of the present invention, in addition to iron, the steel substrate may also contain the following components by weight percentages: carbon 0.2-0.4%; manganese 0.5-1.5%; boron 0-0.005%; no more than 1% of one or more alloy elements selected from aluminum, silicon, chromium, molybdenum, niobium and vanadium; and other inevitable impurity elements.

In other embodiments of the present invention, in addition to iron, the steel substrate may also contain the following components by weight percentages: carbon 0.3-0.5%; manganese 0.5-2.5%; boron 0-0.005%; no more than 3% of one or more alloy elements selected from aluminum, silicon, chromium, molybdenum, niobium and vanadium; and other inevitable impurity elements.

Increasing the contents of carbon, manganese and silicon can improve the hardenability of the steel substrate, and at the same time, martensite can be obtained more easily after the preliminary heat treatment, thus realizing the effect of grain refinement. However, too high contents of carbon, manganese, and silicon will adversely affect the fracture property of the steel substrate. Adding a very small amount of boron can improve the hardenability of the steel substrate without affecting the fracture property. Aluminum can deoxidize during smelting, while protecting the effectiveness of boron. Other elements such as chromium and molybdenum can also improve the hardenability, but disadvantageously increase the cost of steel significantly. On the one hand, vanadium and niobium can refine austenite grains, on the other hand, they can result in precipitation strengthening effect and improve the strength of press hardening components. As a preferred example, the steel substrate can be commercially available 22MnB5 or 34MnB5 steel.

In the embodiments of the present invention, the thickness of the steel substrate may be 0.5-3 mm, and the thickness of the Al—Si pre-coating may be 5-50 μm, preferably 6-25 μm, such as 6-15 μm. In the Al—Si coated press hardening component according to the present invention, the thickness of the steel substrate may be 0.5-3 mm; the thickness of the Al—Si coating may be 10-100 μm, preferably 20-70 μm. In some specific embodiments, the thickness of the Al—Si coated press hardening component is 1.0-1.3 mm, which is a typical thickness of steel for vehicle body safety components.

In the Al—Si coated press hardening component provided by the present invention, the ultimate tensile strength of the press hardening component is 1400-2000 MPa.

Further, the prior austenite grain size in the microstructure of the steel substrate of the Al—Si coated press hardening component provided by the present invention is not more than 18 μm. As a preferred embodiment, the prior austenite grain size in the microstructure of the press hardening component is not more than 10 μm. The higher the degree of grain refinement, the better the fracture property of press hardening steel.

In some specific embodiments, the Al—Si pre-coating contains 8-11% Si, 2-4% Fe, 85-90% Al and inevitable impurities by weight percentages. Al mainly provides the high-temperature stability and oxidation resistance of the coating, but disadvantageously, Al will alloy with the steel substrate at a high temperature to form brittle intermetallics. Si can inhibit the growth of intermetallics and reduce the damage of brittle intermetallics on the fracture property of the steel.

As an example, commercially available 22MnB5 steel pre-coated with an Al—Si coating can be used, wherein the contents of C, Mn and Si in the 22MnB5 steel substrate is 0.20-0.23%, 0.9-1.4% and 0.20-0.28% by weight percentages, respectively. In addition, the thickness of the pre-coated Al—Si coating is about 25 μm.

In a second aspect, the present invention provides a method for preparing an Al—Si coated press hardening component, which includes a two-step heat treatment followed by a hot stamping treatment, wherein the two-step heat treatment includes:

a first step of austenitization: heating an Al—Si pre-coated steel substrate to 951-1100° C. for 5 to 60 minutes, and then cooling to below 300° C. at a rate of not less than 5° C./s; and a second step of grain refinement: heating again the cooled steel substrate to 800-870° C. for 3 to 20 minutes, and then cooling at a rate of not less than 50° C./s, wherein the hot stamping includes: performing the hot stamping at a temperature of not lower than 600° C. during the cooling followed by cooling to room temperature at a rate of not less than 50° C./s.

FIG. 3 is a schematic diagram comparing the existing one-step heat treatment process with the two-step heat treatment process provided by the present invention. According to the preparation method of the present invention, the first step of heat treatment and the second step of heat treatment can be performed continuously or discontinuously. This adds more flexibility to the manufacture of press hardening steel.

According to the preparation method provided by the present invention, the austenitization process of the first step results in the interdiffusion between the steel substrate and the Al—Si pre-coating and thus the formation of an Al—Si coating, and the Al—Si coating comprises a low-Al content ferrite layer with an Al content of less than 5 wt % and a thickness of greater than 5 μm.

Compared with the existing one-step heat treatment process, the austenitization temperature in the first step of the preparation method of the present invention is higher and lasts longer, which will cause the steel substrate to produce larger prior austenite grain size (PAGS), thus affecting the bendability and ultimate tensile strength (UTS) of the material. This is the main reason why researchers avoid increasing the austenitization temperature and duration during hot stamping. The present invention creatively introduces a two-step hot stamping process to overcome this problem. The second heating step in the preparation method according to the present invention can effectively refine the PAGS, so that the PAGS of the steel substrate after the second heating step is much smaller than that of the traditional hot stamping process with a lower austenitization temperature.

In a preferred embodiment of the preparation method of the present invention, the heating temperature for the first step of austenitization is 980-1100° C. and the holding time is 10-30 minutes; the heating temperature for the second step of grain refinement is 830-850° C., and the holding time is 4-7 minutes.

Preferably, the temperature of the hot stamping is 650-850° C.

In a preferred embodiment of the preparation method of the present invention, the holding time for the first step of austenitization is longer than that for the second step of grain refinement.

In a third aspect, the present invention provides use of the press hardening component in safety structural parts, reinforced structural parts, wheel parts or high-strength automobile structural parts of automobiles. Preferably, the press hardening component is used as an A-pillar, B-pillar, roof or beam of an automobile body-in-white.

The present invention improves the bendability of pre-coated steel after hot stamping by improving the hot stamping process. Although pre-coated Al or aluminum alloy coating can prevent the decarburization and surface oxidation of press hardening steel in traditional hot stamping processes, the coating exhibit brittleness as a whole, which significantly reduces the bendability of press hardening steel after hot stamping. In the present invention, after hot stamping, the thickness of tough low-Al content ferrite layer (the weight percentage of Al is less than or equal to 5%) is significantly increased, reaching 5 to 100 μm, preferably 5 to 20 μm, which effectively prevents the formation or propagation of cracks on the surface or the coating. At the same time, the hot stamping process of the present invention can take into account or optimize the microstructure of the steel substrate to further improve the bendability and tensile property of the material. Compared with the same kinds of steel processed by traditional hot stamping processes, the bendability of the Al—Si coated press hardening steel obtained by the present invention is improved by 10% to 60%. The present invention is suitable for, but not limited to, high-strength press hardening steel with a tensile strength level of 1500 MPa or 2000 MPa.

BRIEF DESCRIPTION OF THE DRAWINGS

Hereinafter, the embodiments of the present invention are described in detail in conjunction with the accompanying drawings, wherein:

FIG. 9 shows a comparison of the maximum bending angles of Al—Si coated 2000 MPa 22MnB5 press hardening components in Examples 4 and 5 and Comparative Examples 3 and 4.

SPECIFIC MODES FOR CARRYING OUT THE INVENTION

The present invention is further described in detail below in connection with the specific embodiments, wherein the given embodiments are for illustrative purposes only and do not limit the scope of the invention.

Figure 1:
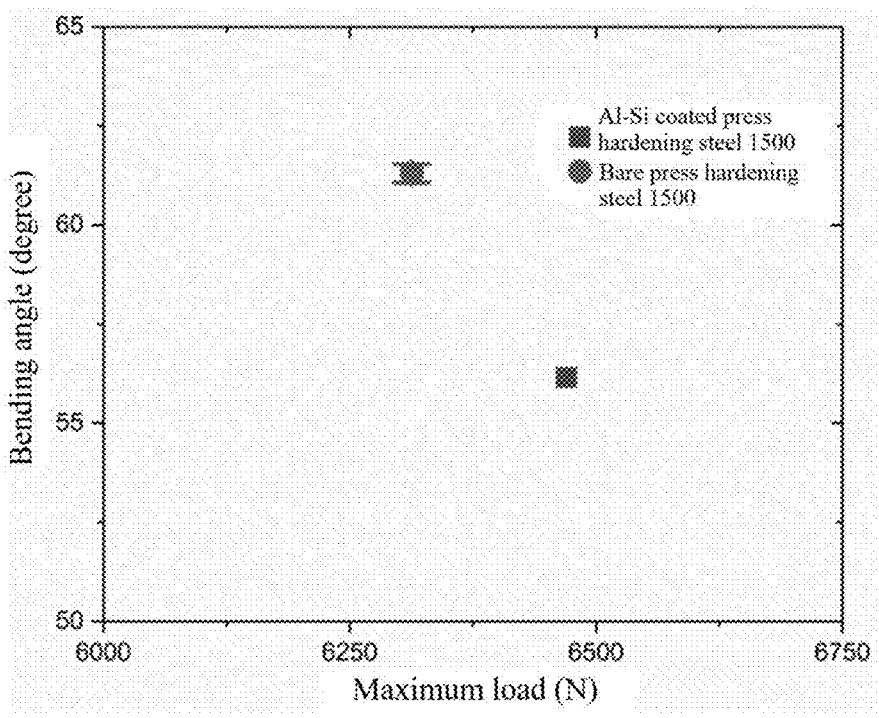
FIG. 1 shows the results of VDA 238-100 standard bending test for the PHS with and without an Al—Si coating.
Figure 2:
FIG. 2 shows the bending deformation of a B-pillar of an automobile after a real traffic accident.
Figure 3:
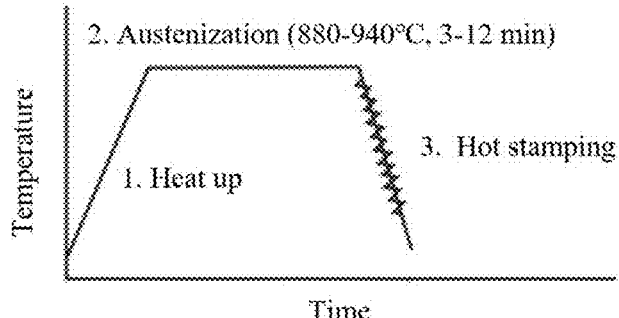
FIG. 3 is a schematic diagram comparing the existing one-step heat treatment process with the two-step heat treatment process according to the present invention.
Figure 3:
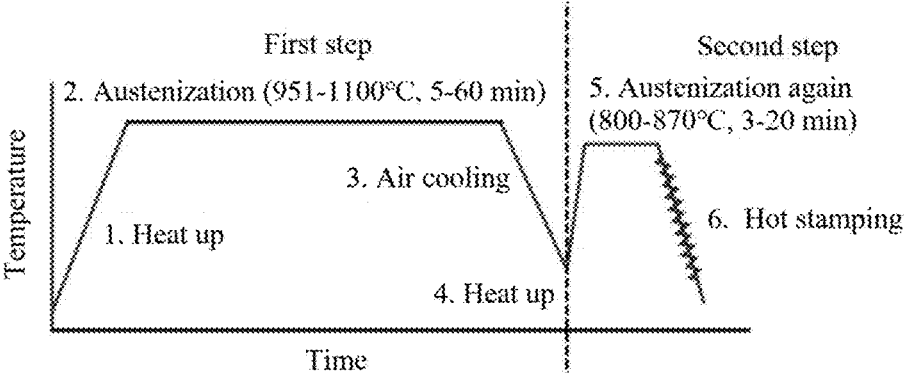
Figure 4:
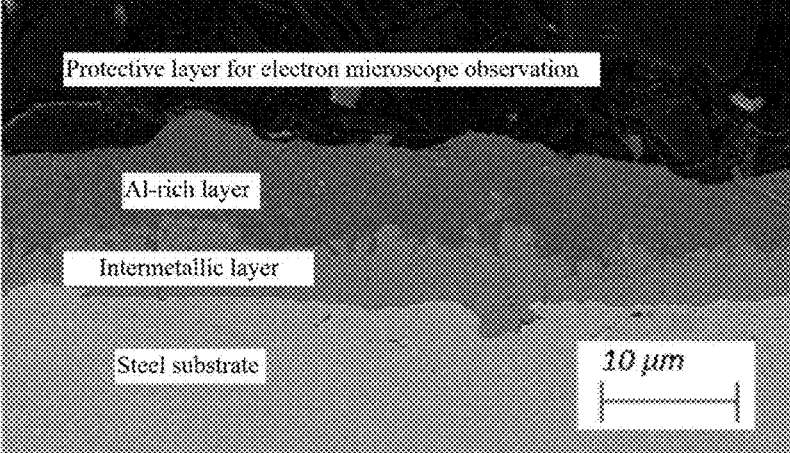
FIG. 4 is an original microstructure diagram of the pre-coating and the steel substrate of 22MnB5 steel used in the examples of the present invention.

The original microstructure of pre-coated Al—Si layer and steel substrate of 22MnB5 steel used in the Examples is shown in FIG. 4, in which the pre-coating in order from the steel substrate side comprises: a Si-rich intermetallic layer and an Al layer, which is a typical pre-coating structure of commercially available 22MnB5 steel. The substrate of steel is mainly composed of ferrite, pearlite and carbide, in which the size of the lamellar pearlite area can reach greater than 2 μm, and the particle size of the spherical carbide can reach greater than 0.5 μm.

Example 1

An Al—Si coated press hardening component with the strength of 1500 MPa was prepared by the method of the present invention.

The Al—Si pre-coated steel (1500 MPa, 22MnB5) used in this example was purchased from TKAS Auto Steel Co., Ltd., TA1500-B10NC4, having a thickness of 1.22 mm, in which the thickness of the steel substrate is about 1.2 mm and the thickness of the Al—Si pre-coating is about 11 μm. The method involves the following steps S1-S3:

S1, austenitization: the Al—Si pre-coated steel was heated to 980° C. at a heating rate of 10° C./s, then held for 20 minutes, and then cooled to below 300° C. at a rate of 5° C./s;

S2, grain refinement: the cooled steel was heated again to 830° C. at a heating rate of 10° C./s for 7 minutes;

S3: when the heat preservation was finished, the hot steel was immediately transferred to a mold to ensure that the temperature of the steel was above 600° C. when it was transferred to the mold, and the steel was hot stamped in the mold to obtain the final press hardening component, followed by being cooled to room temperature at the rate of 50° C./s.

Example 2

The Al—Si pre-coated steel (1500 MPa, 22MnB5) used in this example was purchased from TKAS Auto Steel Co., Ltd., TA1500-B10NC4, having a thickness of 1.23 mm, in which the thickness of the steel substrate is about 1.2 mm and the thickness of the Al—Si pre-coating is about 15 μm.

According to a method similar to that in Example 1, an Al—Si coated press hardening component with the strength of 1500 MPa was prepared, with the differences that the austenitization conditions in step S1 were: temperature of 1030° C., holding time of 10 minutes; and the conditions of grain refinement in step S2 were: temperature of 840° C., holding time of 5 minutes.

Example 3

The Al—Si pre-coated steel (1500 MPa, 22MnB5) used in this example was purchased from TKAS Auto Steel Co., Ltd., TA1500-B10NC4, having a thickness of 1.22 mm, in which the thickness of the steel substrate is about 1.2 mm and the thickness of the Al—Si pre-coating is about 11 μm.

According to a method similar to that in Example 1, an Al—Si coated press hardening component with the strength of 1500 MPa was prepared, with the differences that: the austenitization conditions in step S1 were: temperature of 1030° C., holding time of 20 minutes; and the conditions of grain refinement in step S2 were: temperature of 850° C., holding time of 6 minutes.

Example 4

An Al—Si coated press hardening component with a strength of 2000 MPa was prepared.

The Al—Si pre-coated steel (2000 MPa) used in this example was purchased from TKAS Auto Steel Co., Ltd., TA2000-B10ZBG, having a thickness of 1.22 mm, in which the thickness of the steel substrate is about 1.2 mm and the thickness of the Al—Si pre-coating is about 10 µm.

S1, austenitization: the Al—Si pre-coated steel was heated to 1100° C. at a heating rate of 50° C./s for 15 minutes, and then cooled to below 300° C. at a rate of 5° C./s;

S2, grain refinement: the cooled steel was heated again to 870° C. at a heating rate of 50° C./s for 4 minutes;

S3: when the heat preservation was finished, the hot steel was immediately transferred to a mold to ensure that the temperature of the steel was above 600° C. when it was transferred to the mold, and the steel was hot stamped in the mold to obtain the final press hardening component, followed by being cooled to room temperature at the rate of 50° C./s.

Example 5

The Al—Si pre-coated steel (2000 MPa) used in this example was purchased from TKAS Auto Steel Co., Ltd., TA2000-B10ZBG, having a thickness of 1.23 mm, in which the thickness of the steel substrate is about 1.2 mm and the thickness of the Al—Si pre-coating is about 13 µm.

According to a method similar to that in Example 4, an Al—Si coated press hardening component with a strength of 2000 MPa was prepared, with the differences that: the austenitization conditions in step S1 were: temperature of 1100° C., holding time of 30 minutes; and the conditions of grain refinement in step S2 were: temperature of 850° C., holding time of 5 minutes.

Comparative Example 1

An Al—Si coated press hardening component with the strength of 1500 MPa was prepared by an existing method.

The Al—Si pre-coated steel (1500 MPa, 22MnB5) used in this comparative example was purchased from TKAS Auto Steel Co., Ltd., TA1500-B10NB1, having a thickness of 1.22 mm, in which the thickness of the steel substrate is about 1.15 mm and the thickness of the Al—Si pre-coating is about 35 µm.

S1, austenitization: the Al—Si pre-coated steel was heated to 930° C. at a heating rate of 10° C./s, then held for 7 minutes;

S2: when the heat preservation was finished, the hot steel was immediately transferred to a mold to ensure that the temperature of the steel was above 600° C. when it was transferred to the mold, and the steel was hot stamped in the mold to obtain the final press hardening component, followed by being cooled to room temperature at the rate of 50° C./s.

Comparative Example 2

An Al—Si coated press hardening component with the strength of 1500 MPa was prepared by an existing method.

The Al—Si pre-coated steel (1500 MPa, 22MnB5) used in this comparative example was purchased from TKAS Auto Steel Co., Ltd., TA1500-B10NC4, having a thickness of 1.24 mm, in which the thickness of the steel substrate is about 1.22 mm and the thickness of the Al—Si pre-coating is about 11 µm. The following steps were followed:

S1, austenitization: the Al—Si pre-coated steel was heated to 930° C. at a heating rate of 10° C./s, then held for 7 minutes; and S2: when the heat preservation was finished, the hot steel was immediately transferred to a mold to ensure that the temperature of the steel was above 600° C. when it was transferred to the mold, and the steel was hot stamped in the mold to obtain the final press hardening component, followed by being cooled to room temperature at the rate of 50° C./s.

Comparative Example 3

An Al—Si coated press hardening component with a strength of 2000 MPa was prepared by an existing method.

The Al—Si pre-coated steel (2000 MPa) used in this comparative example was purchased from TKAS Auto Steel Co., Ltd., TA2000-B10NBG, having a thickness of 1.27 mm, in which the thickness of the steel substrate is about 1.2 mm and the thickness of the Al—Si pre-coating is about 35 µm. The following steps were followed:

S1, austenitization: the Al—Si pre-coated steel was heated to 930° C. at a heating rate of 10° C./s for 7 minutes; and S2: when the heat preservation was finished, the hot steel was immediately transferred to a mold to ensure that the temperature of the steel was above 600° C. when it was transferred to the mold, and the steel was hot stamped in the mold to obtain the final press hardening component, followed by being cooled to room temperature at the rate of 50° C./s.

Comparative Example 4

A thin Al—Si coated press hardening component with a strength of 2000 MPa was prepared by an existing method.

The Al—Si pre-coated steel (2000 MPa) used in this comparative example was purchased from TKAS Auto Steel Co., Ltd., TA1500-B10ZBG, having a thickness of 1.22 mm, in which the thickness of the steel substrate is about 1.2 mm and the thickness of the Al—Si pre-coating is about 10 µm. The following steps were followed:

S1, austenitization: the Al—Si pre-coated steel was heated to 930° C. at a heating rate of 50° C./s, then held for 7 minutes; and S2: when the heat preservation was finished, the hot steel was immediately transferred to a mold to ensure that the temperature of the steel was above 600° C. when it was transferred to the mold, and the steel was hot stamped in the mold to obtain the final press hardening component, followed by being cooled to room temperature at the rate of 50° C./s.

Comparative Example 5

In this comparative example, Al—Si pre-coated steel the same as in Example 1 was only subjected to Step S1 of austenitization and Step S3 of hot stamping, but not to Step S2 of grain refinement.

Comparative Example 6

In this comparative example, Al—Si pre-coated steel the same as in Example 1 was heat-treated according to the conditions in CN107614733A.

The Al—Si pre-coated steel (1500 MPa, 22MnB5) was heated at 990° C. for 10 minutes, and then immediately transferred to a mold to ensure that the temperature of the steel was above 600° C. when it was transferred to the mold, and the steel was hot stamped in the mold to obtain the final press hardening component, followed by being cooled to room temperature at the rate of 50° C./s.

Characterization and Testing

Figure 5:
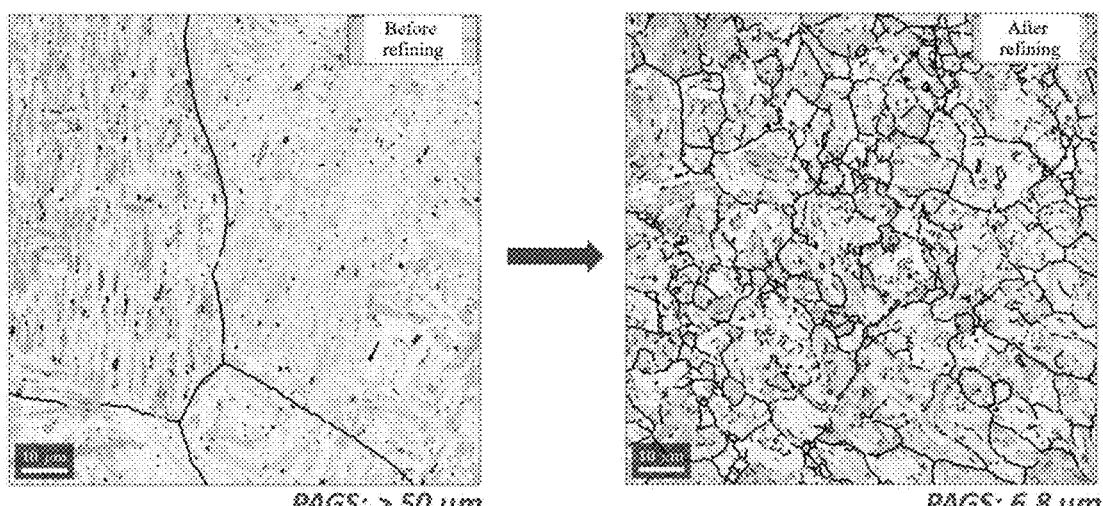
FIG. 5 shows a comparison of the microstructures of the steel substrate before and after the grain refining step in Example 5 of the present invention.

1. FIG. 5 shows a comparison of electron back scattering diffraction (EBSD) of the microstructures of the steel substrate before and after the grain refining step in Example 5. It can be observed that after the grain refining step, the prior austenite grains in the micro-structure were significantly refined, and the prior austenite grain size was reduced from greater than 50 μm before the grain refining step to 6-7 μm after the grain refining step.

Figure 6:
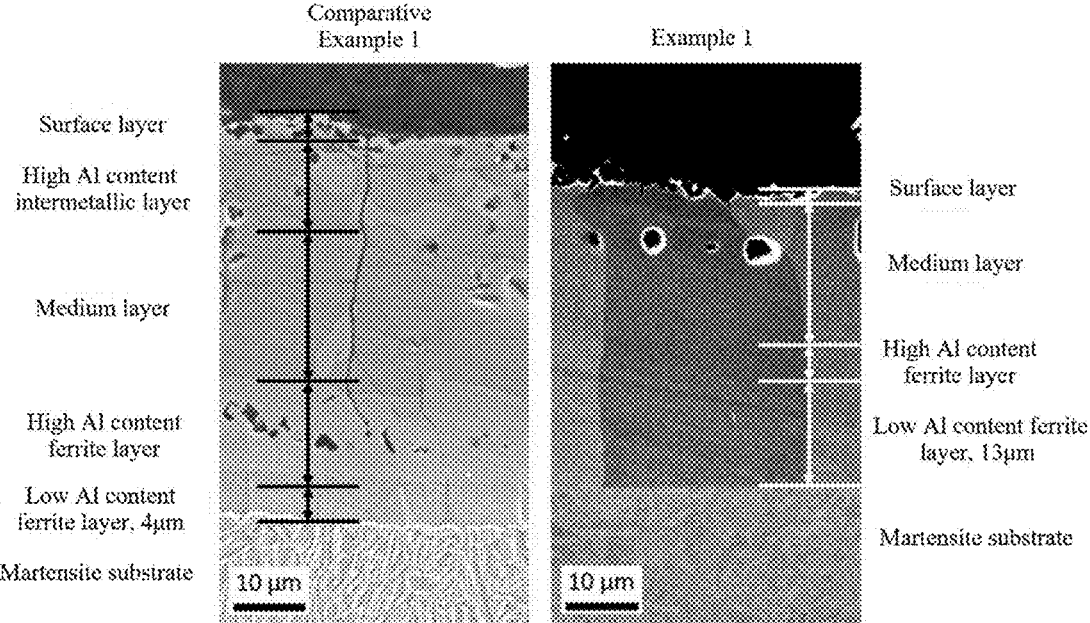
FIG. 6 shows a comparison of the cross-sectional microstructures of the press hardening components obtained in Comparative Example 1 and Example 1.

2. FIG. 6 shows a comparison of the cross-sectional microstructures of the press hardening components obtained in Comparative Example 1 and Example 1. As can be seen from FIG. 6, compared with Comparative Example 1, the coating in Example 1 has no Al-rich intermetallic layer, and the brittleness of the whole coating was reduced. The thickness of the low-Al content ferrite layer in Example 1 reached 13 μm, which is higher than 4 μm in Comparative Example 1. The thickness of the ultra-low-Al content ferrite layer in Example 1 is 5.9 μm. Because only the low-Al content ferrite layer (including the ultra-low-Al content ferrite layer) has a high toughness, which can hinder crack propagation in the bending process, and thus Example 1 has a better bending toughness than Comparative Example 1. Further, its bending angle can reach 65 degrees, which is higher than 56 degrees in Comparative Example 1.

Figure 7:
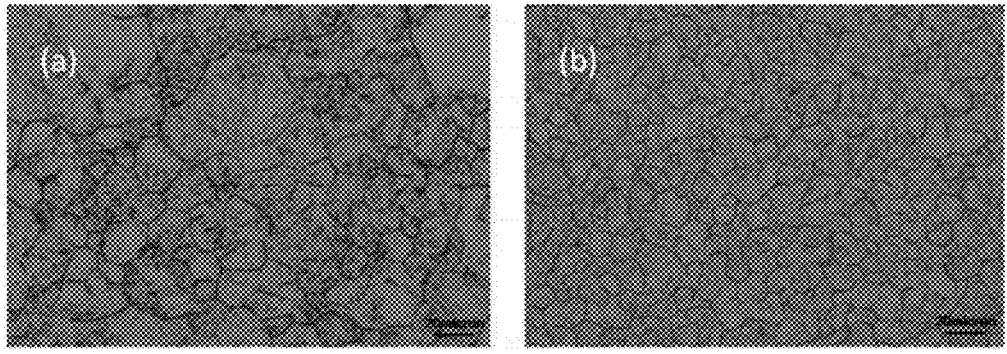
FIG. 7 shows a comparison of prior austenite grain size (PAGS) of the press hardening components obtained in Comparative Example 1 and Example 1.

3. FIG. 7 shows a comparison of prior austenite grain size (PAGS) of the press hardening components obtained in Comparative Example 1 (a) and Example 1 (b). It can be observed that compared with the traditional hot stamping process with a low austenitization temperature, a much smaller PAGS is obtained by the two-step heat treatment process of the present invention.

4. The maximum bending angles of the press hardening components of Examples 1-5 and Comparative Examples 1-4 were measured by the VDA 238-100 standard bending test.

Figure 8:
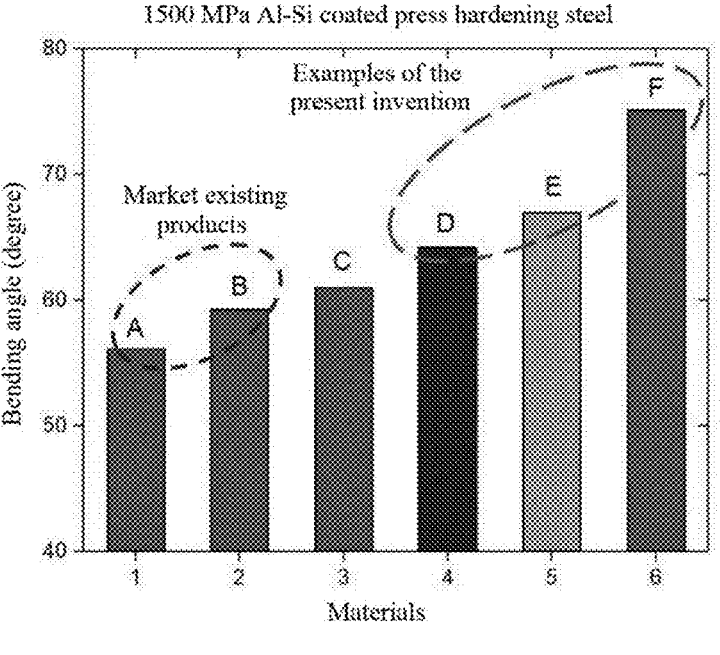
FIG. 8 shows a comparison of the maximum bending angles of Al—Si coated 1500 MPa 22MnB5 press hardening components in Examples 1-3 and Comparative Examples 1, 2 and 6.

FIG. 8 shows a comparison of the maximum bending angles of the Al—Si coated 1500 MPa 22MnB5 press hardening components in Examples 1-3 and Comparative Examples 1, 2 and 6, in which: (A) represents the Al—Si coated 1500 MPa 22MnB5 in Comparative Example 1; (B) represents the Al—Si coated 1500 MPa 22MnB5 in Comparative Example 2; (C) represents the Al—Si coated 1500 MPa 22MnB5 in Comparative Example 6 that was heat treated according to CN107614733A; (D) represents the Al—Si coated 1500 MPa 22MnB5 in Example 1 (the austenitization parameters: 980° C., 20 minutes); (E) represents the Al—Si coated 1500 MPa 22MnB5 in Example 2 (the austenitization parameters: 980° C., 20 minutes); and (F) represents the Al—Si coated 1500 MPa 22MnB5 in Example 3 (the austenitization parameters: 1030° C., 20 minutes).

Figure 9:
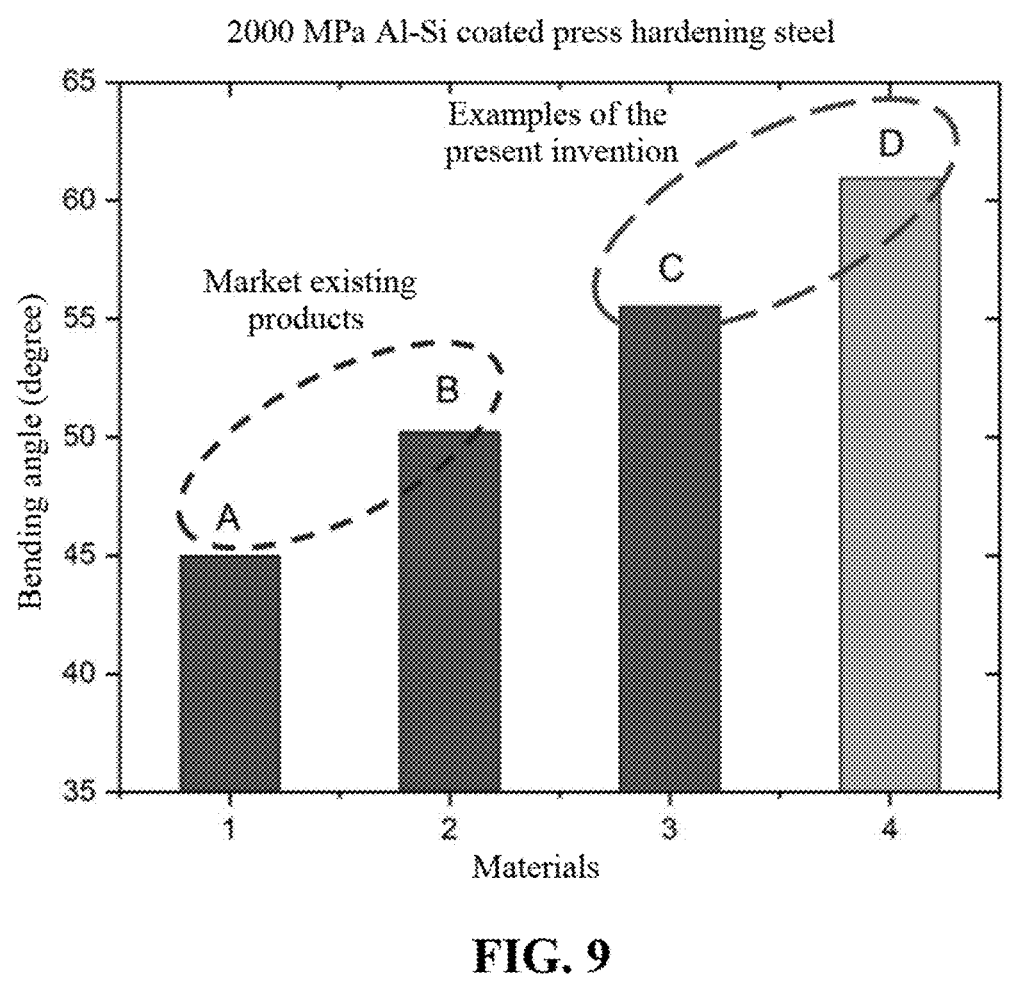

FIG. 9 shows a comparison of the maximum bending angles of Al—Si coated 2000 MPa 22MnB5 press hardening components in Examples 4 and 5 and Comparative Examples 3 and 4, in which: (A) represents the Al—Si coated 2000 MPa 22MnB5 in Comparative Example 3; (B) represents the Al—Si coated 2000 MPa 22MnB5 in Comparative Example 4; (C) represents the Al—Si coated 2000 MPa 22MnB5 in Example 4 (the austenitization parameters:

1100° C., 15 minutes); and (D) represents the Al—Si coated 2000 MPa 22MnB5 in Example 5 (the austenitization parameters: 1100° C., 30 minutes).

The experimental results of the VDA 238-100 standard bending test in FIG. 8 and FIG. 9 show that the bendability of Al—Si coated PHS has been significantly improved after the hot stamping process including the two-step heat treatment of the present invention.

Figure 10:
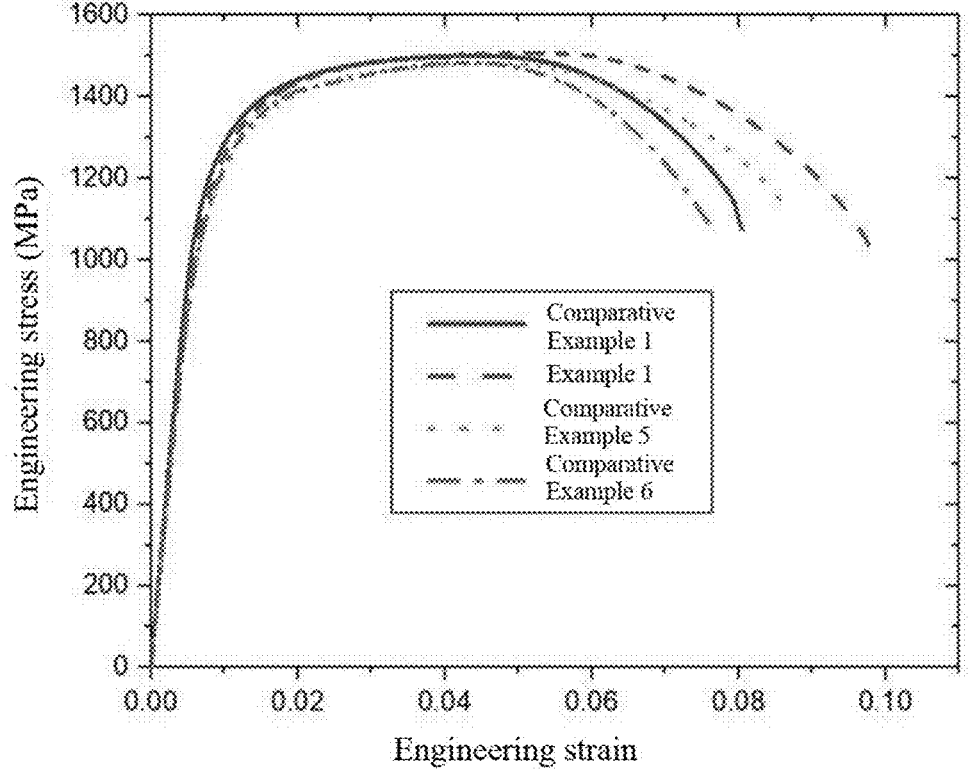
FIG. 10 shows a comparison of the tensile test results of the press hardening components obtained in Example 1 and Comparative Examples 1, 5 and 6.

5. A uniaxial quasi-static tensile method was used to conduct tensile tests on the press hardening components obtained in Example 1 and Comparative Examples 1, 5 and 6. The results are shown in FIG. 10. The test results in FIG. 10 show that Example 1 of the present invention, Comparative Example 1 of the existing product, Comparative Example 5 without the grain refinement, and Comparative Example 6 using the heat treatment method in CN107614733A result in almost the same yield strength, but the maximum tensile strength of the present invention is higher. Thus, the heat treatment method of the present invention has no negative influence on the tensile mechanical properties of the material, but instead enhances the plasticity of the material. Compared with Comparative Examples 1, 5 and 6, the plasticity of the material prepared in Example 1 of the present invention was increased by 22.5%, 14% and 28.9%, respectively. Combined with the maximum bending angle of the samples of the present invention, which is significantly increased compared with Comparative Examples, it can be concluded that the examples of the present invention bring about more excellent mechanical properties than the Comparative Examples.

The above examples are only preferred examples of the present invention, and do not impose any limitation on the present invention. Without departing from the scope of the technical solutions of the present invention, any form of equivalent replacement or modification and other changes made by anyone skilled in the art to the technical solutions and technical contents of the present invention do not depart from the technical solutions of the present invention, and still belong to the scope of protection of the present invention.

The invention claimed is:

1. An Al—Si coated press hardened component, which comprises a steel substrate and an Al—Si coating arranged on at least one surface of the steel substrate, the Al—Si coating comprising a low-Al content ferrite layer with an Al content of less than 5 wt % formed by interdiffusion between the steel substrate and an Al—Si pre-coating, wherein the thickness of the low-Al content ferrite layer is at least 8 μm, the maximum bending angle of the Al—Si coated press hardened component is greater than 66°, as measured by VDA 238-100 standard bending test, and wherein a prior austenite grain size in the microstructure of the steel substrate is not more than 18 μm.

2. The Al—Si coated press hardened component according to claim 1, wherein the thickness of the low-Al content ferrite layer is 8-100 μm.

3. The Al—Si coated press hardened component according to claim 1, wherein the low-Al content ferrite layer comprises an ultra-low-Al content ferrite layer having an Al content of less than 3 wt % and a thickness of at least 5 μm.

4. The Al—Si coated press hardened component according to claim 1, wherein the thickness of the low-Al content ferrite layer accounts for 20%-98.5% of the thickness of the Al—Si coating.

5. The Al—Si coated press hardened component according to claim 1, wherein the maximum bending angle of the Al—Si coated press hardening component is greater than 70°.

6. The Al—Si coated press hardened component according to claim 1, wherein the thickness of the steel substrate is 0.5-3 mm; and the thickness of the Al—Si coating is 10-100 μm.

7. The Al—Si coated press hardened component according to claim 6, wherein the thickness of the Al—Si coating is 20-70 μm.

8. A method for preparing the Al—Si coated press hardened component of claim 1, which includes a two-step heat treatment followed by a hot stamping treatment, wherein the two-step heat treatment comprises:

a first step of austenitization: heating the Al—Si precoated steel substrate to 951-1100° C. and holding for 5 to 60 minutes, and then cooling to below 300° C. at a rate of not less than 5° C./s; and a second step of grain refinement: heating again the cooled steel substrate to 800-870° C. and holding for 3 to 20 minutes, wherein the hot stamping includes: performing the hot stamping at a temperature of not lower than 600° C. during cooling, followed by cooling to room temperature at a rate of not less than 50° C./s.

9. The preparation method according to claim 8, wherein the heating temperature for the first step of austenitization in is 980-1100° C., and the holding time is 10-30 minutes;

optionally, the heating temperature for the second step of grain refinement is 830-850° C., and the holding time is 4-7 minutes, optionally, the temperature of the hot stamping is 650-850° C.

10. The preparation method according to claim 8, wherein the holding time for the first step of austenitization is longer than that for the second step of grain refinement.

11. A method of using the press hardened component according to claim 1 by fabricating a structural part-of an automobile from the press hardened component.

12. The Al—Si coated press hardened component according to claim 1, wherein the thickness of the low-Al content ferrite layer is greater than 20 μm.

13. The Al—Si coated press hardened component according to claim 2, wherein the wherein the thickness of the low-Al content ferrite layer is 8-25 μm.

14. The Al—Si coated press hardened component according to claim 3, wherein the ultra-low-Al content ferrite layer has a thickness greater than 8 μm.

15. The Al—Si coated press hardened component according to claim 14, wherein the ultra-low-Al content ferrite layer has a thickness greater than 15 μm.

16. The Al—Si coated press hardened component according to claim 15, wherein the ultra-low-Al content ferrite layer has a thickness greater than 20 μm.

17. The Al—Si coated press hardened component according to claim 3, wherein the thickness of the ultra-low-Al content ferrite layer is 5-25 μm.

18. The Al—Si coated press hardened component according to claim 1, wherein the ultimate tensile strength of the press hardened component is 1400-2000 MPa.

19. The Al—Si coated press hardened component according to claim 3, wherein the ultra-low-Al content ferrite layer has a thickness of is 5-100 μm.

20. The Al—Si coated press hardened component according to claim 5, wherein the maximum bending angle of the Al—Si coated press hardening component is about 75°.

\* \* \* \* \*